(12) United States Patent
Sedarat et al.

(10) Patent No.: US 12,001,267 B1
(45) Date of Patent: *Jun. 4, 2024

(54) ASYMMETRIC DATA TRANSMISSION USING ENERGY-EFFICIENT ETHERNET

(71) Applicant: Ethernovia Inc., San Jose, CA (US)

(72) Inventors: Hossein Sedarat, San Jose, CA (US); Ramin Shirani, Morgan Hill, CA (US); Roy T. Myers, Jr., Morgan City, CA (US); Darren S. Engelkemier, Menlo Park, CA (US)

(73) Assignee: Ethernovia Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/307,341

(22) Filed: Apr. 26, 2023

Related U.S. Application Data

(63) Continuation of application No. 16/742,394, filed on Jan. 14, 2020, now Pat. No. 11,714,478.

(60) Provisional application No. 62/825,724, filed on Mar. 28, 2019, provisional application No. 62/797,826, filed on Jan. 28, 2019.

(51) Int. Cl.
*G06F 1/32* (2019.01)
*G06F 1/3296* (2019.01)
*H04L 12/10* (2006.01)

(52) U.S. Cl.
CPC .......... *G06F 1/3296* (2013.01); *H04L 12/10* (2013.01)

(58) Field of Classification Search
None
See application file for complete search history.

(56) References Cited

U.S. PATENT DOCUMENTS

| | | |
|---|---|---|
| 2009/0282277 A1 | 11/2009 | Sedarat et al. |
| 2012/0320771 A1 | 12/2012 | Chini et al. |
| 2014/0229751 A1 | 8/2014 | Manav et al. |
| 2016/0204900 A1 | 7/2016 | Tu et al. |
| 2016/0359638 A1 | 12/2016 | Shi et al. |
| 2020/0313840 A1 | 10/2020 | Den Besten |
| 2020/0403824 A1 | 12/2020 | Benyamin et al. |

FOREIGN PATENT DOCUMENTS

EP 3860045 A1 8/2021

OTHER PUBLICATIONS

U.S. Appl. No. 16/742,394, filed Jan. 14, 2020, Asymmetric Data Transmission Using Energy-Efficient Ethernet.
"U.S. Appl. No. 16/742,394, Advisory Action dated Aug. 31, 2022", 3 pgs.
"U.S. Appl. No. 16/742,394, Examiner Interview Summary dated Feb. 11, 2022", 2 pgs.
"U.S. Appl. No. 16/742,394, Final Office Action dated Jun. 9, 2022", 23 pgs.
"U.S. Appl. No. 16/742,394, Non Final Office Action dated Oct. 27, 2022", 26 pgs.

(Continued)

*Primary Examiner* — Fahmida Rahman
(74) *Attorney, Agent, or Firm* — Schwegman Lundberg & Woessner, P.A.

(57) ABSTRACT

Various embodiments provide for asymmetric data transmission using Energy-Efficient Ethernet (EEE), which can be used in such applications as data network communications between sensors (e.g., cameras, motion, radar, etc.) and computing equipment within vehicles (e.g., smart and autonomous cars).

20 Claims, 9 Drawing Sheets

(56) References Cited

OTHER PUBLICATIONS

"U.S. Appl. No. 16/742,394, Non Final Office Action dated Nov. 26, 2021", 17 pgs.
"U.S. Appl. No. 16/742,394, Notice of Allowance dated Feb. 15, 2023", 7 pgs.
"U.S. Appl. No. 16/742,394, Response filed Jan. 23, 2023 to Non Final Office Action dated Oct. 27, 2022", 10 pgs.
"U.S. Appl. No. 16/742,394, Response filed Feb. 23, 2022 to Non Final Office Action dated Nov. 26, 2021", 12 pgs.
"U.S. Appl. No. 16/742,394, Response filed Aug. 9, 2022 to Final Office Action dated Jun. 9, 2022", 14 pgs.

ASYMMETRIC DATA TRANSMISSION USING ENERGY-EFFICIENT ETHERNET

CROSS-REFERENCE TO RELATED APPLICATIONS

This application is a continuation of U.S. patent application Ser. No. 16/742,394, filed on Jan. 14, 2020, which claims priority to and the benefit of U.S. Provisional Patent Application No. 62/797,826, filed on Jan. 28, 2019, and U.S. Provisional Patent Application No. 62/825,724, filed on Mar. 28, 2019, each of which is incorporated herein by reference.

TECHNICAL FIELD

Embodiments described herein relate to data communications and, more particularly, to systems, methods, devices, and instructions for asymmetric data transmissions using Energy-Efficient Ethernet (EEE) framework.

BACKGROUND

While Ethernet physical layer standards typically specify symmetric communication systems (e.g., one that supports identical data rate in both directions of a data link, such as 10 Gbps in both directions), certain applications are better suited to use an asymmetric Ethernet-based communication system, where the data rate in one direction of a given data link between two devices is different from the rate in the other direction of the given data link. Examples of such applications include, without limitation: applications where data in one direction can fluctuate and demand varying data throughput with time; a network-attached display that consumes a large amount of data but may generate only limited amounts of data; and a network-attached camera sensor that generates large amount of data and needs very limited control input. For instance, a camera sensor being used by an automobile can send multi-gigabits/s data (e.g., camera captures multiple frames a second) and would only need to receive very little data to control operation of the camera sensor (e.g., basic controls to zoom, pan, etc.). In such an instance, the camera sensor can establish and use an asymmetric data link with a processor of the automobile, where the data rate from the processor to the camera sensor is at a lower than the data rate from the camera to the processor. In doing so, the processor (as a data transmitter) and the camera (as a data receiver) can use less power than it would otherwise would if a symmetric data link was used instead.

Some existing Ethernet standards define a low power feature known as Energy-Efficient Ethernet (EEE), which can provide significant power savings when there is no data to transmit between devices. For some implementations, EEE is defined as an asymmetric data communications scheme in which a data transmitter of a device can be in low-power idle (LPI) mode when it has no data to send and while its EEE data link-partner is transmitting data in normal mode. While in LPI mode, a number of components in the transmitter or receiver implementing EEE may be shut down to save power. When the data transmitter of the device has data to send, the data transmitter can transition out of LPI mode and into normal mode (e.g., to facilitate data transmission as bursts of data). Generally, an upper layer network component of a transmitter-side device (e.g., application layer) decides whether there is no data to transmit on the transmitter-side device and instructs the physical layer (PHY) of the transmitter-side device to transition into (or transition out of) LPI mode accordingly.

Though EEE is currently available to lower power usage by devices during Ethernet-based communication, traditional EEE still has high peak power usage given that while in LPI mode, receiver components of an EEE receiving device generally continue to operate (e.g., remain active) so that the EEE receiving device can monitor for one or more signals, such as Alert signals (from an EEE transmitting device to the EEE receiving device) to signal a transition from LPI mode to normal mode. In applications that involve high data speeds, such as 10 Gbps, the power consumption by receiving components while monitoring for the signal (e.g., Alert signal) while in LPI mode can be substantial. Additionally, with traditional EEE, devices send data transmit data in bursts during normal modes and transition from LPI to normal mode often, which results in frequent data overhead (e.g., sleep time and wake time). This can be detrimental when the amount of data being transmitted from EEE transmitting device to the EEE receiving device is not large (e.g., control data from a processor to a camera sensor within an automobile).

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
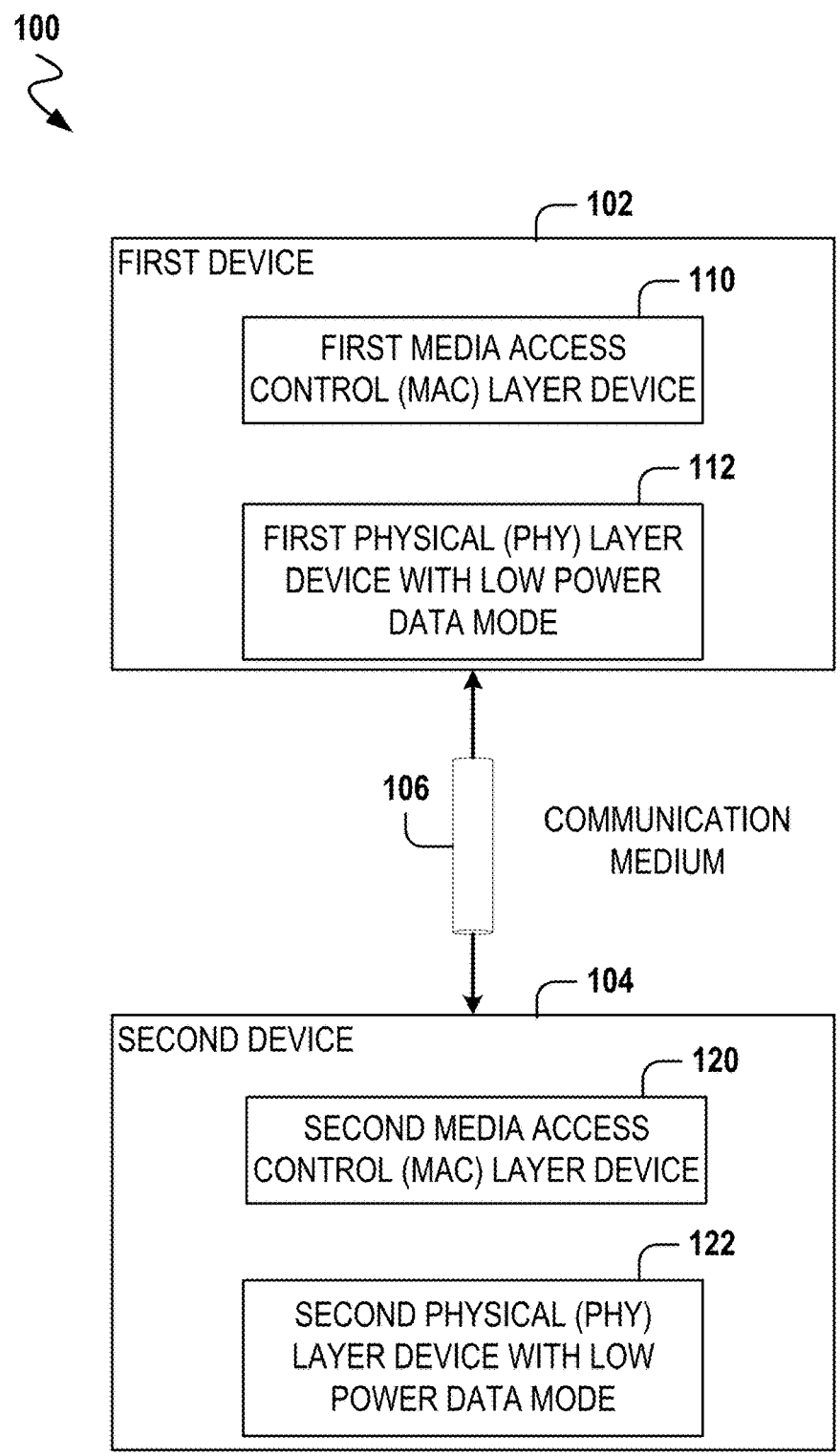
FIG. 1 is a block diagram illustrating an example system comprises a first device and a second device that can use asymmetric data transmission using Energy-Efficient Ethernet (EEE), in accordance with some embodiments.

Various embodiments provide for asymmetric data transmission using Energy-Efficient Ethernet (EEE) framework, which can be used in such applications as data network communications between sensors (e.g., cameras, motion, radar, etc.) and computing equipment within vehicles (e.g., smart and autonomous cars). In particular, some embodiments provide for a data-carrying low power consumption mode (also referred herein to as low power data (LPD) mode or a low power low data rate (LPLD) mode) with respect asymmetric data transmission based on EEE framework, where the data-carrying low power consumption mode can enable or facilitate data transmission (over an asymmetric data link) between a sending device and a receiving device at a low power consumption at a low data rate while in lower power consumption mode. For example, during a period of low power consumption (e.g., low power consumption similar to LPI mode of EEE), the data-carrying low power consumption mode can enable or facilitate asymmetric data transmission from a sending device to a receiving device at a power consumption level that is lower than what would otherwise be possible (from the sending device to receiving device) by a normal mode of EEE. Additionally, by using some embodiments, the overhead of transitioning in and out of LPI mode can be eliminated, and the flow of low-data rate traffic can be more uniform and less bursty.

According to some embodiments, while a sending device and a receiving device are in low power consumption mode, a refresh signal is transmitted from the sending device to the receiving device (e.g., every N quiet-refresh cycles), and the refresh signal is followed by one or more data frames while the sending and receiving devices remain in low power consumption mode (e.g., without entering normal mode). For instance, every $N^{th}$ quiet-refresh cycle, one or more data frames are transmitted from the sending device to the receiving device after the refresh signal. For some embodiments, a wake signal is transmitted after the refresh signal but prior to transmission of the one or more data frames. The refresh signal and the wake signal prior to the data transmission enable the receiving device to prepare to receive the one or more transmitted data frames at a target error rate (e.g., enable the receiving device to prepare by provide training signal and a transition period to receive the one or more transmitted data frames).

Additionally, for some embodiments, a special refresh signal according to an EEE definition is defined to carrying data (e.g., limited data) during a data-carrying low power consumption mode. Depending on the embodiment, the special refresh signal can be transmitted every N cycles, and the special refresh signal can be transmitted for a duration that is longer than a duration for transmitting a refresh signal during other quiet-refresh cycles. For some embodiments, the special refresh signal duration for transmitting the special refresh signal is long enough that the signal-to-noise ratio (SNR) meets or exceeds a threshold of data transmission (e.g., using PAM2 modulation). For some embodiments, the special refresh signal starts with a PAM2 training signal and is backloaded with data over PAM2 modulation. The transition time between the training signal and data during a special refresh signal can be settled between link-partners (e.g., the sending and receiving devices) in advance.

Some embodiments are implemented by extending an existing definition of EEE to support the data-carrying low power consumption mode. For example, with respect to a particular Ethernet standard that provides EEE, the Ethernet standard can be extended to include a LPD/LPLD mode that is similar to, or defined based on, a LPI mode of the EEE. For instance, an embodiment can be implemented by extending EEE as defined by 10GBASE-T1 of IEEE 802.3ch, which can achieve a data rate of 10 Gbps over a single twisted pair cable (such as one in a vehicle or aircraft for data communication) between a transmitter and a receiver. Various embodiments are described herein in the context of systems based on 10GBASE-T1 of IEEE 802.3ch are illustrative purposes, and some embodiments are implemented with respect to other Ethernet standards (e.g., other Ethernet standards including EEE). Example applications that can use an embodiment described herein can include, without limitation, an application that involves data traffic is a trickle being transmitted (rather than bursts of data) at a continuous and predictable data rate.

For some embodiments, over an asymmetric data link, a first date rate achieved from a first physical layer device to a second physical layer device while the first and second physical layer device are in a data-carrying lower power consumption mode (e.g., LPD or LPLD mode) is based on a second data rate available between the first and second physical layer devices over a symmetric data link. For instance, a date rate $R_l$ in data-carrying low power consumption mode can be related to a $R_h$ a data rate in normal mode by Equation 1 as follows:

$$R_l = \frac{T_d}{N(T_r + T_q)} R_h$$

where $T_r$ represents a time duration of a refresh signal, $T_q$ represents a duration of a quiet time within the given quiet-refresh cycle, and $T_d$ represents a time duration for transmitting data (e.g., one or more data frames) after the refresh signal (e.g., after the refresh signal and a wake signal). Data frames, with duration of $T_d$, can be transmitted over N quiet-refresh cycles.

In another instance, the duration of the data frames, $T_d$, can be chosen to be a multiple ($N_d$) of the duration of Refresh signal $T_r$. In this case, a data rate $R_l$ in data-carrying low power consumption mode can be related to a $R_h$ a data rate in normal mode by Equation 2 as follows:

$$R_l = \frac{N_d}{N_p \times N} R_h$$

where $N_d$ represents a number of data frames following a refresh signal, $N_p$ represents the duration of a full quiet-refresh cycle relative to the duration of the refresh signal, and N represents number quiet-refresh cycles that corresponding data frames are transmitted.

For example, assume a data frame has a duration of T (e.g., T=320 ns for a Reed-Solomon frame carrying 3200 bits of data), $T_r$ is an integer multiple of T, and $T_q$ is an integer multiple of T. Where a data rate during normal mode is 10 Gbps (e.g., 10GBASE-T, where a time duration of a refresh signal is $T_r$ T, a duration of a quiet time is $T_q$=T×99, and a time duration of a quiet-refresh cycle $T_{qr}$=T×100), a data rate of 10 Mbps can be achieved in a data-carry low power consumption mode as described herein (e.g., for lower latency, using 1 data frame for every 10 quiet-refresh cycles, N=10 and $T_d$=T; or for lower power, using 2 data frames for every 20 quiet-refresh cycles, N=20 and $T_d$=T× 2).

In another example, where a data rate during normal mode is 10 Gbps (e.g., 10GBASE-T, where a time duration of a refresh signal is $T_r$ T, a duration of a quiet time is $T_q$=T×99, and a time duration of a quiet-refresh cycle $T_{qr}$T×100),), a data rate of 100 Mbps can be achieved in a data-carry low power consumption mode as described herein (e.g., for lower latency, using 1 data frame for every quiet-refresh cycles, N=1 and $T_d$=T; or for lower power, using 10 data frames for every 10 quiet-refresh cycles, N=10 and $T_d$=T× 10).

In another example, where a data rate during normal mode is 5 Gbps (e.g., 5GBASE-T), a data rate of 10 Mbps can be achieved in a data-carry low power consumption mode as described herein (e.g., for lower latency, using 1 data frame for every 5 quiet-refresh cycles, N=5 and $T_d$=T; or for lower power, using 2 data frames for every 10 quiet-refresh cycles, N=10 and $T_d$=Tx 2).

In another example, where a data rate during normal mode is 2.5 Gbps (e.g., 2.5GBASE-T), a data rate of 10 Mbps can be achieved in a data-carry low power consumption mode as described herein (e.g., for lower latency, using 2 data frame for every 5 quiet-refresh cycles, N=5 and $T_d$=T×2; or for lower power, using 4 data frames for every 10 quiet-refresh cycles, N=10 and $T_d$=T×4).

With respect to power, for some embodiments, a transmit and receive power $P_l$ of in the data-carrying low power consumption mode can be roughly expressed in terms of a corresponding a transmit and receive power $P_h$ in normal mode and a transmit and receive power $P_e$ in LPI mode by Equation 3 as follows:

$$P_l = \frac{R_l}{R_h} P_h + \left(1 + \frac{T'_r + T_w - T_r}{NT_r}\right)(P_e - P_a)$$

where $T'_r$ represents a time duration of a refresh signal that precedes one or more data frames within a given quiet-refresh cycle (may be longer than a nominal refresh signal that does not precede transmission of one or more data frames), $T_w$ represents a time duration of an optional wake signal within the given quiet-refresh cycle, $T_r$ represents a time duration of a refresh signal that does not precede one or more data frames within the given quiet-refresh cycle, N represents the number of quiet-rest cycles at which a refresh signal is transmitted followed by one or more data frames, and power $P_a$ associated with transmitting/receiving alert signals (which is 0 if alert signals are still being used by an embodiment, i.e., the physical layer devices are not remaining indefinitely in the data-carrying low power consumption mode). In view of this power relationship, for some embodiments, $T_d$ can be increased (instead of reducing N) when a higher data rate is desired in data-carrying low power consumption mode.

By using various embodiments described herein, a first physical layer device and a second physical layer device can avoid or reduce the need for alert signals (transmission by the first physical layer device, and detection by the second physical layer device) to facilitate transition from a LPI mode to a normal mode when the first physical layer device needs to send data to the second physical layer device. In particular, where the first physical layer device and the second physical layer device establish and maintain an asymmetric data link and remain in a data-carrying low power consumption mode, the first physical layer device and the second physical layer device can avoid use of alert signals (as there is no need to transition out of the data-carrying low power consumption mode). In doing so, the first physical layer device and the second physical layer device can turn off components (e.g., mechanisms or blocks) used in the transmission/detection of alert signals during quiet times of a quiet-refresh cycle, which in turn can reduce power consumption (e.g., further than LPI mode alone) by the first physical layer device and the second physical layer device.

By using various embodiments described herein, a first physical layer device and a second physical layer device can avoid or reduce the need to transition between a LPI mode and a normal mode to facilitate transmission of data from the first physical layer device and the second physical layer device.

By implementing various embodiments by extending an existing EEE standard, the one or more components (e.g., modulation, coding, framing, etc.) used to support the data-carrying low power consumption mode can be similar/same as the one or more components used to support a LPI mode.

Additionally, use of various embodiments described herein can be suitable for applications where a first physical layer device transmits data at a low rate to the second physical layer device over an asymmetric data link, and the second physical layer device transmits data in high rate to the first physical layer device over the asymmetric data link. For instance, where a camera sensor and a processor (e.g., within an automobile) establish an asymmetric data link, the processor and camera sensor can be in (e.g., transition to or enter) a data-carrying low power consumption mode for a data connection from the processor to the camera sensor, and the processor and camera sensor can be in (e.g., transition to or enter) a normal mode for a data connection from the camera sensor to the processor. In this way, the processor can transmit data (e.g., control data) at a low data rate (e.g., 100 Mbps), while the camera sensor can transmit data (e.g., image data in data bursts) at a high data rate (e.g., 10 Gbps).

As used herein, a refresh signal can comprise a refresh signal in accordance with a EEE standard, which can be used for timing lock between two physical layer devices and can be used to carry training data that a receiving physical layer device can use to configure (e.g., adapt or optimize) its signal filters (e.g., for equalization and echo cancellation). As also used herein, a quiet-refresh cycle can comprise a cycle having at least one refresh signal and at least one period of quiet time at the end of the cycle, such as a LPI cycle.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a block diagram illustrating an example system 100 comprises a first device 102 and a second device 104 that can use asymmetric data transmission using Energy-Efficient Ethernet (EEE) framework, in accordance with some embodiments. Depending on the embodiment, the first device 102 can be implemented (at least in part) by machine 900 of FIG. 9, and the second device 104 can be implemented (at least in part) by machine 900 of FIG. 9. As shown, the communication medium 106 operatively couples the first device 102 to the second device 104, where the communication medium 106 can support an asymmetric data link. The communication medium 106 can comprise a wire (e.g., twisted pair) that permits transmission of an analog signal. As also shown, the first device 102 comprises a first media access control (MAC) layer device 110, and a first physical (PHY) layer device 112 with low power data mode as described herein, and the second device 104 comprises a second media access control (MAC) layer device 120, and a second physical (PHY) layer device 122 with low power data mode as described herein.

Each of the first physical layer device 112 and the second physical layer device 122 can implement features or methodologies described herein with respect to various embodiments. The first media access control (MAC) layer device 110 represents one or more components of the first device 102 that implement or enable a MAC layer of a network stack of the first device 102, and the first physical (PHY) layer device 112 represents one or more components of the first device 102 that implement or enable a PHY layer of a network stack of the first device 102. The second media access control (MAC) layer device 120 represents one or more components of the second device 104 that implement or enable a MAC layer of a network stack of the second device 104, and the second physical (PHY) layer device 122 represents one or more components of the second device 104 that implement or enable a PHY layer of a network stack of the second device 104.

Figure 2:
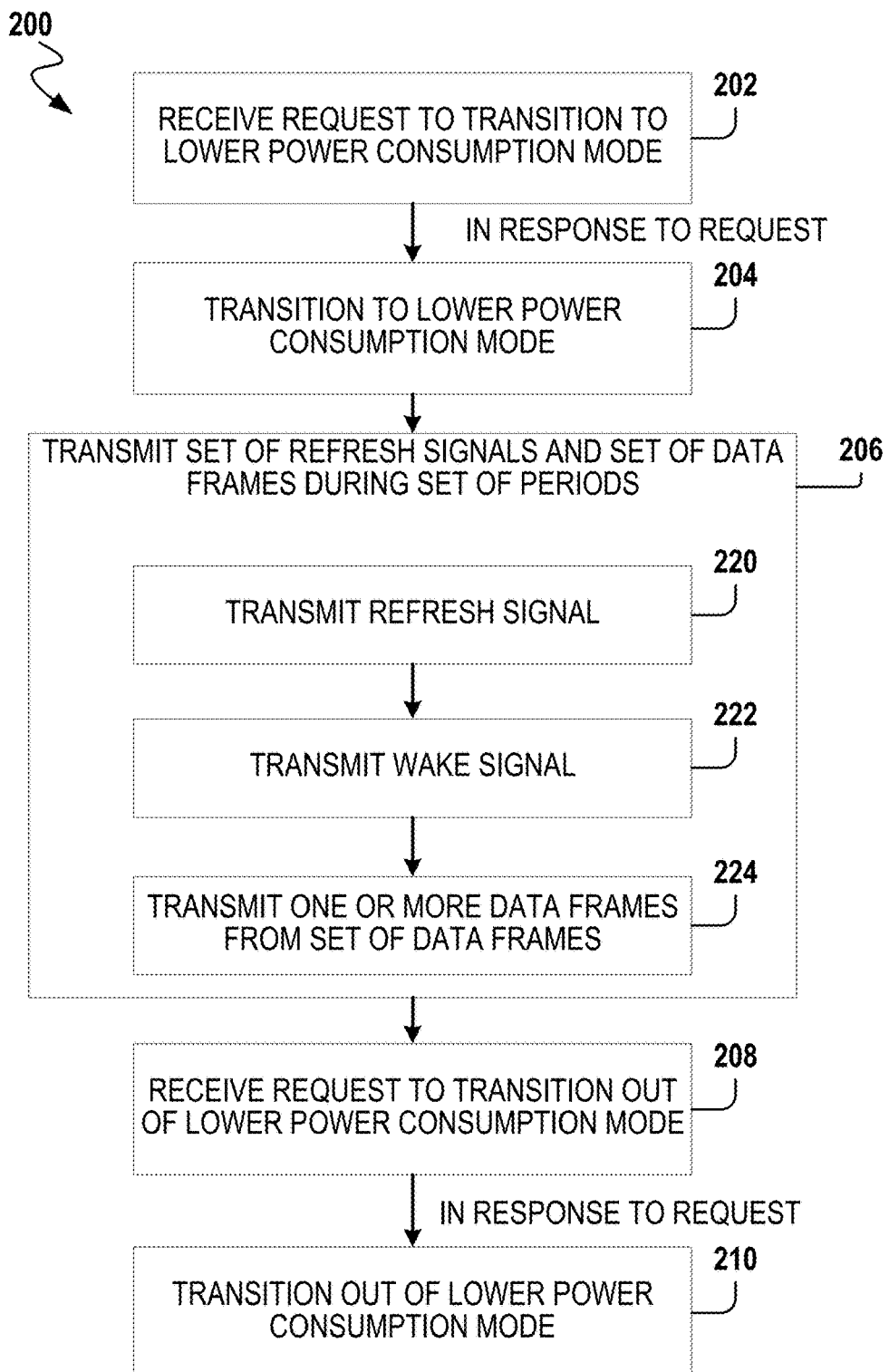
FIGS. 2 through 4 are flowcharts illustrating example methods for asymmetric data transmission using EEE, in accordance with some embodiments.
Figure 3:
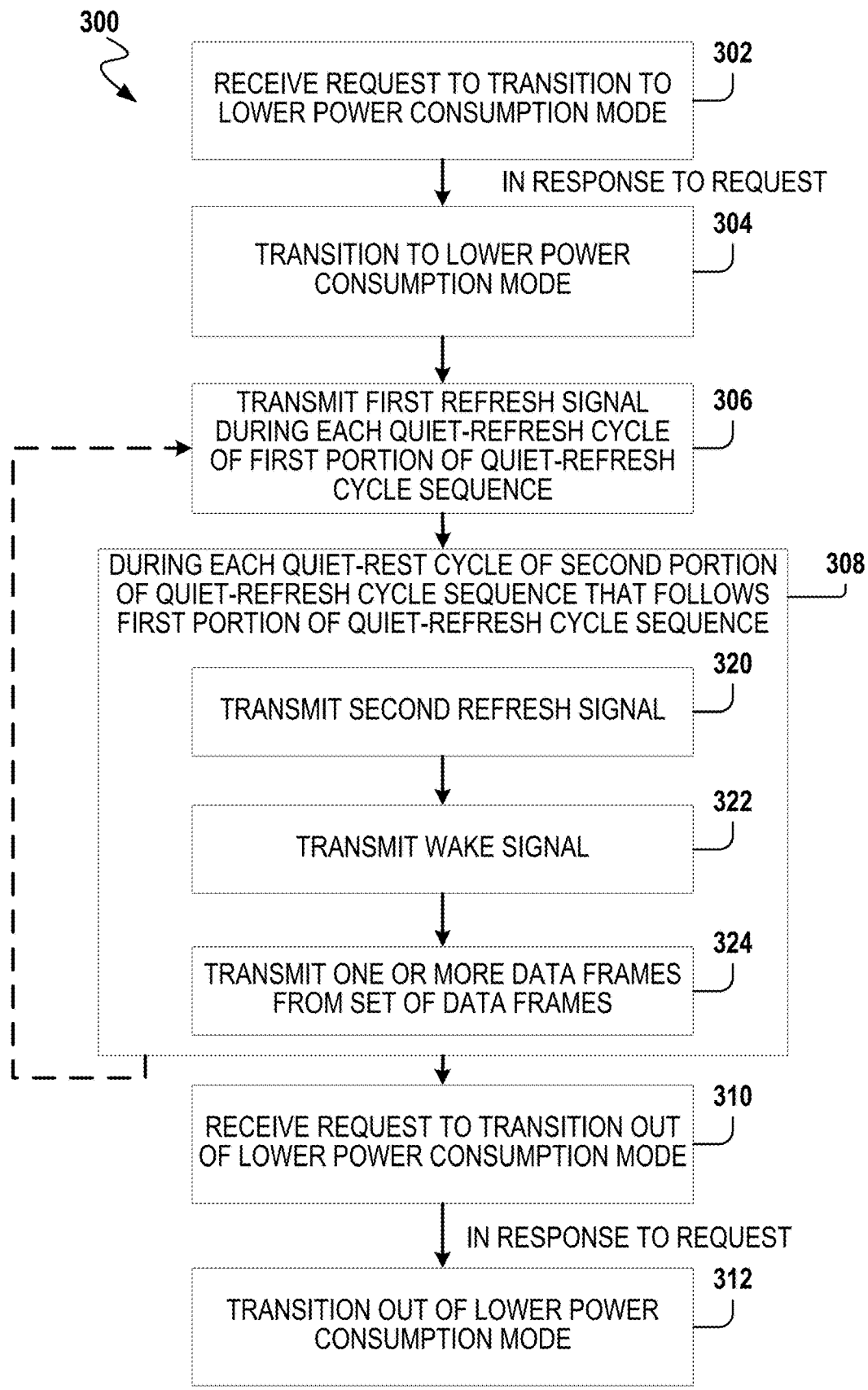
Figure 4:
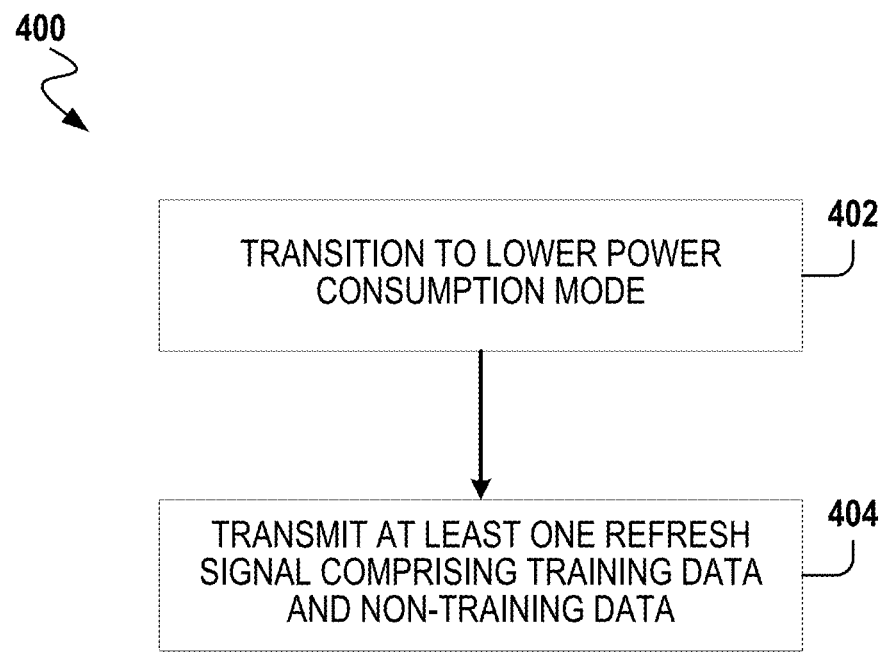

FIGS. 2 through 4 are flowcharts illustrating example methods 200, 300, 400 for asymmetric data transmission using Energy-Efficient Ethernet (EEE) framework, in accordance with some embodiments. It will be understood that example methods described herein may be performed by various circuit components, including for example addition circuits, comparators, slicers, digital-to-analog convertors (DAC), analog-to-digital convertors (ADC), delay components, feed-forward equalizers, echo cancellers, crosstalk cancellers, wrap components, precoders, DFEs and the like. For instance, the methods 200, 300, 400 may be performed by the first physical (PHY) layer device 112 described with respect to FIG. 1. Depending on the embodiment, an operation of an example method described herein may involve intervening operations not shown. Additionally, though the operations of example methods may be depicted and described in a certain order, the order in which the operations are performed may vary among embodiments, including performing certain operations in parallel.

Referring now to FIG. 2, at operation 202, a first physical layer device (e.g., 112) receives a request to transition to a lower power consumption mode (e.g., LPD or LPLD). For some embodiments, the first physical layer device (e.g., 112) is configured to communicate data with a second physical layer device (e.g., 122) over a data transmission medium using an Energy Efficient Ethernet (EEE) standard. Depending on the embodiment, the EEE is based on an Ethernet standard, such as IEEE 802.3ch. The request received by operation 202 can originate from a media access controller (MAC) layer device (e.g., first media access controller layer device 110). The request can be generated in response to an upper layer determining that there is data to be transferred (from the first physical layer device to the second physical layer device) which would be suitable for transfer at a lower data rate available while in low power consumption mode (e.g., available in LPD or LPLD mode). The request can comprise a defined ordered-set (e.g., "/lpd/" or "/lpld/") that can signal a transition to the low power consumption mode (e.g., LPD or LPLD) described herein.

The method 200 continues with operation 204, where the first physical layer device transitions to the lower power consumption mode. Depending on the embodiment, the first physical layer device can transition to the lower power consumption mode after training is performed between the first physical layer device and the second physical layer device. For instance, the first and second physical layer devices can be configured to automatically transition to low power consumption mode (e.g., LPD or LPLD mode), and to establish and maintain an asymmetric data connection after the transition. Additionally, or alternatively, the first physical layer device can transition to the lower power consumption mode in response to the request received by operation 202. For instance, in response to the request received by operation 202, the first physical layer device can transition to the low power consumption mode from a normal mode (e.g., that supports a symmetric connection between the first and second physical layer devices) or from a LPI mode as described herein. For some embodiments, the first physical layer device transitioning to the lower power consumption mode comprises the first physical layer device (e.g., 112) causing (e.g., signaling) the second physical layer device (e.g., 122) to transition to the lower power consumption mode, which can facilitate data transmission from the first physical layer device to the second physical layer device over an asymmetric data link.

While in low power consumption mode, the method 200 continues with operation 206, where the first physical layer device transmits to the second physical layer device a set of refresh signals and a set of data frame during a set of periods, where each period comprises a sequence of quiet-refresh cycles. For some embodiments, for at least one period of the set of periods, the first physical layer device performs operations 220 through 224. In particular, at operation 220, the first physical layer device first physical layer device transmits a refresh signal to the second physical layer device. This is illustrated, for example, by refresh signal 510 in FIG. 5. After operation 220, the first physical layer device transmits a wake signal to the second physical layer device at operation 222. This is illustrated, for example, by wake signal 512 in FIG. 5. At operation 224, the first physical layer device transmits to the second physical layer device one or more data frames, from the set of data frames, to the second physical layer device. This is illustrated, for example, by data 514 in FIG. 5. For some embodiments, operation 224 is performed after operation 220 and, additionally, can be performed after operation 222. The transmission of the one or more data frames by operation 224 can enable the first physical layer device to support data transmission from the first physical layer device to the second physical layer device at a first data transmission rate while in the low power consumption mode. For some embodiments, the first data transmission rate is slower than or equal to a second data transmission rate available to the first physical layer device while in a normal power mode. Depending on the embodiment, at operation 224, the first physical layer device can transmit to the second physical layer device a data frame by operation 224 using at least one of a PAM2 modulation or PAM4 modulation. Additionally, the data frames can comprise Reed-Solomon (RS) coding.

Figure 7:
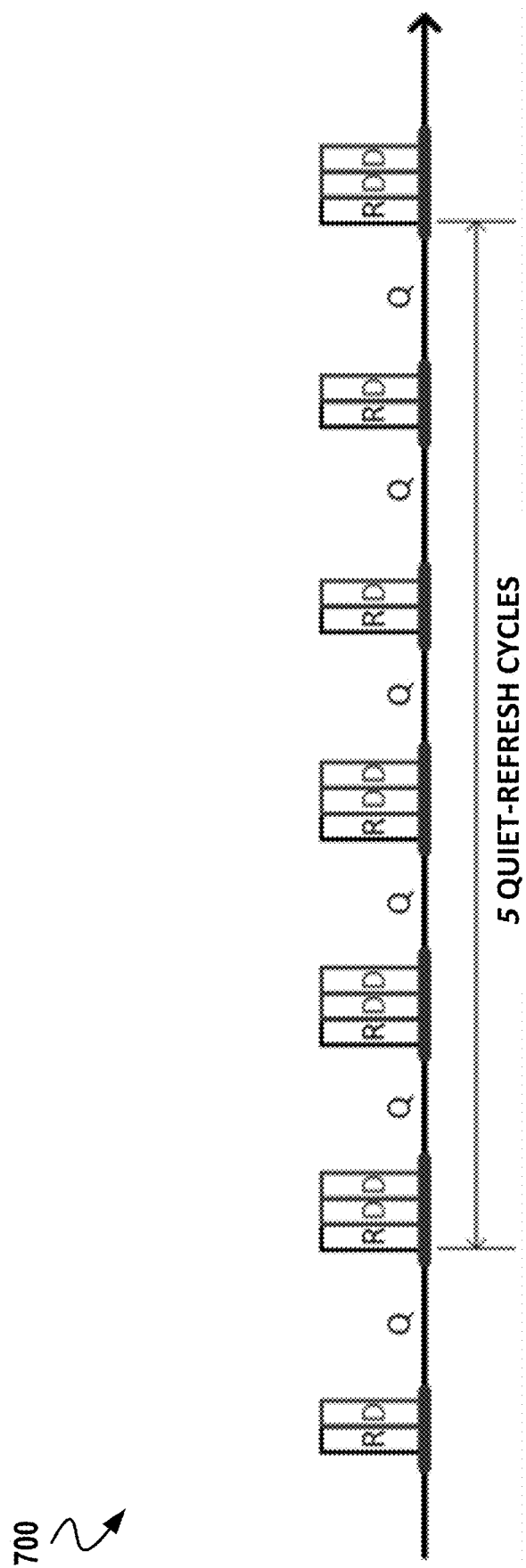

For some embodiments, the sequence of quiet-refresh cycles of a period comprises a subsequence of quiet-refresh cycles, where a certain number of data frames are transmitted after each refresh signal transmitted during the subsequence of quiet-refresh cycles. For example, the subsequence of quiet-refresh cycles can comprise 5 quiet-refresh cycles, where the refresh signal of each quiet-refresh cycle is followed by a certain number of data frames according to a pattern comprising: $(d_1, d_2, d_3, d_4, d_5)$, where $d_i$ indicates the number of data frames transmitted after the i th refresh signal (e.g., (1, 1, 1, 1, 0), (2, 2, 2, 1, 1), or (4, 3, 3, 3, 3)). FIG. 7 illustrates an example of where the subsequence of quiet-refresh cycles comprises 5 quiet-refresh cycles where data frames are transmitted according to a pattern comprising (2, 2, 2, 2, 1, 1). The following Table 1 illustrates an example of achieving a data rate $R_l$ during a data-carrying low power consumption mode of 100 Mbps based on a given data rate $R_h$ available during a normal mode (based on Equation 2 and Equation 3) and given pattern of transmission.

TABLE 1

| $R_h$ | $N_p$ | $N_d$ with (pattern) | $P_l$ |
|---|---|---|---|
| 10 Gbps | 80 frames | 5 frames (1, 1, 1, 1, 0) | $P_e$-$P_a$ + 0.01 $P_h$ |
| 5 Gbps | 80 frames | 5 frames (2, 2, 2, 1, 1) | $P_e$-$P_a$ + 0.02 $P_h$ |
| 2.5 Gbps | 80 frames | 5 frames (4, 3, 3, 3, 3) | $P_e$-$P_a$ + 0.04 $P_h$ |

For some embodiments, the number of frames and/or pattern of transmitting the data frames during a given quiet-refresh cycle can be determined between a first physical layer device and a second physical layer device in advance of transmitting data (e.g., during a negotiation period that occurs prior to or during establishment of the asymmetric data link). Accordingly, the number of data frames and the (predetermined) pattern are known by the physical layer devices coupled by an asymmetric data link. The number of data frames and the pattern can vary between embodiments and can be based on a target/desired data rate in low power consumption mode and based on a target/desired level of power consumption.

According to some embodiments, for at least another period of the set of periods, the first physical layer device transmitting, to the second physical layer device, a second refresh signal. For such embodiments, the second refresh signal can be followed by transmission of another refresh signal (e.g., the refresh signal transmitted by operation 220), and where no data frames are transmitted from the first physical layer device to the second physical layer device between the second refresh signal and the other refresh signal. This is illustrated, for example, by refresh signal 520 in FIG. 5, and quiet time 522 between refresh signal 520 and the next refresh signal 530.

The method 200 continues with operation 208, where the first physical layer device receives a request to transition out of the lower power consumption mode (e.g., LPD or LPLD mode). For instance, the request can comprise a request to transition to a normal mode or a LPI mode as described herein. The request received by operation 208 can originate from a media access controller (MAC) layer device (e.g., first media access controller layer device 110). The request can be generated in response to an upper layer determining that there is data to be transferred (from the first physical layer device to the second physical layer device) which would not be suitable for transfer at a low data rate available while in low power consumption mode (e.g., available in LPD or LPLD mode).

The method 200 continues with operation 210, where the first physical layer device transitions out of the lower power consumption mode in response to the request received by operation 208. For example, the first physical layer device can transition from the low power consumption mode (e.g., LPD or LPLD mode) to a normal mode or to a LPI mode. For some embodiments, the first physical layer device transitioning out of the lower power consumption mode comprises the first physical layer device (e.g., 112) causing (e.g., by transmitting a signal, such as an alert signal to) the second physical layer device (e.g., 122) to transition out of the lower power consumption mode.

Figure 5:
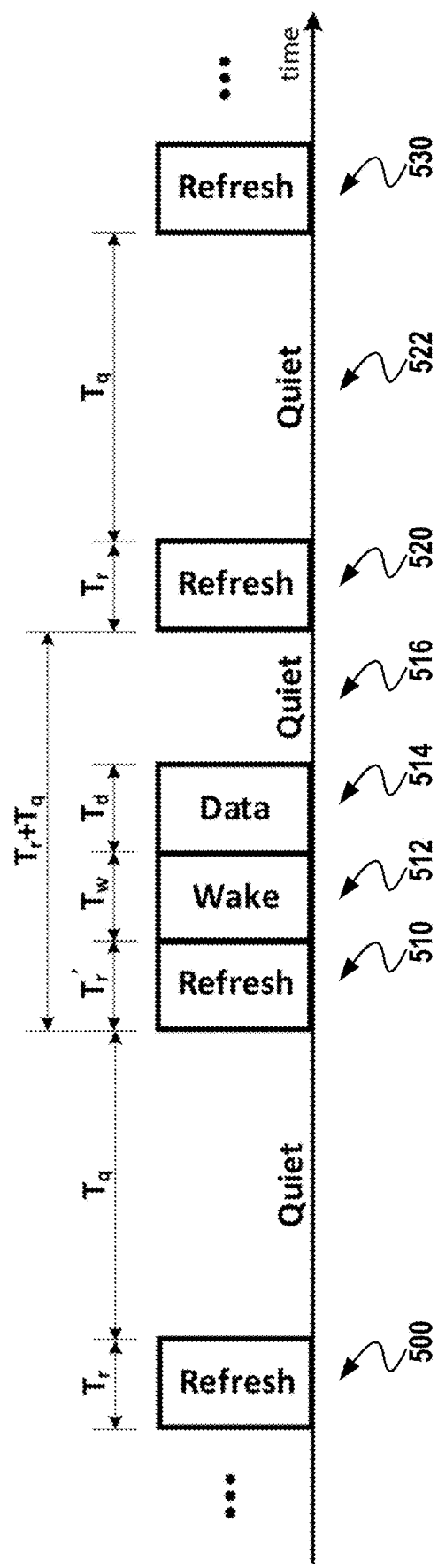
FIGS. 5 through 7 are diagrams illustrating examples of transmitting a set of refresh signals and a set of data frame during a set of periods, in accordance with some embodiments.
Figure 6:
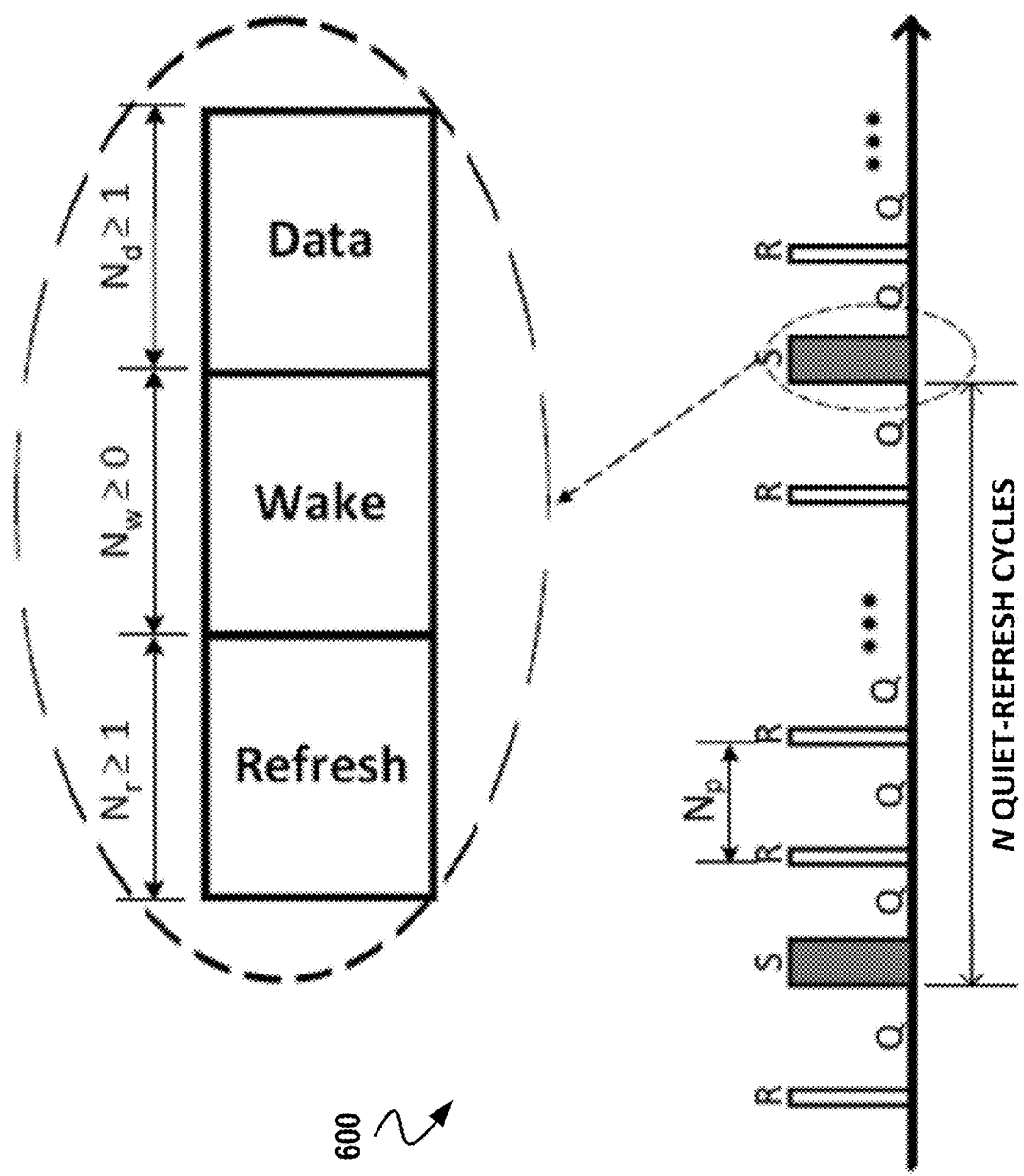

FIGS. 5 through 6 illustrate examples of data transmissions that can be facilitated by the method 200 of FIG. 2.

Referring now to FIG. 3, the method 300 illustrates an asymmetric data transmission using EEE that involves a first physical layer device (e.g., 112) transmitting (to a the second physical layer device) one or more refresh signals without data frames during a first portion of a sequence of quiet-refresh cycles, and transmitting one or more refresh signals with data frames during a second portion of the sequence of quiet-refresh cycles. For some embodiments, operations 302 and 304 are respectively similar to operations 202 and 204 of the method 200 described above with respect to FIG. 2. As described herein, the first physical layer device (e.g., 112) can be configured to communicate data with the second physical layer device (e.g., 122) over a data transmission medium using an Energy Efficient Ethernet (EEE) standard. Depending on the embodiment, the EEE is based on an Ethernet standard, such as IEEE 802.3ch.

While in low power consumption mode, the method 300 continues with operation 306, where the first physical layer device transmits to the second physical layer device a first refresh signal during each quiet-refresh cycle of a first portion of the sequence of quiet-refresh cycles. For some embodiments, a second portion of the sequence of quiet-refresh cycles follows the first portion, and during each quiet-refresh cycle of the second portion, the first physical layer device performs operations 320 through 324. In particular, at operation 320, the first physical layer device first physical layer device transmits a second refresh signal to the second physical layer device. This is illustrated, for example, by refresh signal 510 in FIG. 5. After operation 320, the first physical layer device transmits a wake signal to the second physical layer device at operation 322. This is illustrated, for example, by refresh signal 512 in FIG. 5. At operation 324, the first physical layer device transmits one or more data frames to the second physical layer device. This is illustrated, for example, by data 514 in FIG. 5. For some embodiments, operation 324 is performed after operation 320 and, additionally, can be performed after operation 322. The transmission of the one or more data frames by operation 324 can enable the first physical layer device to support data transmission from the first physical layer device to the second physical layer device at a first data transmission rate while in the low power consumption mode. As noted herein, for some embodiments, the first data transmission rate is slower than or equal to a second data transmission rate available to the first physical layer device while in a normal power mode.

According to some embodiments, the first refresh signal comprises a first type of refresh signal, and the second refresh signal comprises a second type of refresh signal. Depending on the embodiment, the second type of refresh signal can be transmitted with a longer time duration than the first type of refresh signal. For instance, the second type of refresh signal may be transmitted long enough that its signal-to-noise (SNR) surpasses a threshold of data transmission, such as a threshold for using PAM2 modulation or a threshold for using PAM4 modulation. Aspects of this are illustrated respect to graph 800 of FIG. 8. Additionally, for some embodiments, the second type of refresh signal can carry non-training data, which can be in addition to the training data carried by the second type of refresh signal. For instance, a first portion of the second type of refresh signal (starting after the refresh signal SNR reaches a PAM2 modulation SNR threshold) can comprise training data, and the second (backend) portion of the second type of refresh signal (starting after the refresh signal SNR reaches a PAM4 modulation SNR threshold) can comprise non-training data.

The end of operation 308 can represent the end a transmission period. For some embodiments, from operation 308, the method 300 can continue to operation 306 and repeat start another transmission period. Alternatively, at operation 310, the first physical layer device receives a request to transition out of the lower power consumption mode (e.g., LPD or LPLD mode), and at operation 312, the first physical layer device transitions out of the lower power consumption mode in response to the request received by operation 310. For some embodiments, operations 310 and 312 are respectively similar to operations 208 and 210 of the method 200 described above with respect to FIG. 2.

FIGS. 5 and 6 illustrate examples of data transmissions that can be facilitated by the method 300 of FIG. 3.

Referring now to FIG. 4, at operation 402, a first physical layer device transitions to the lower power consumption mode. For some embodiments, operation 402 is similar to operation 204 of the method 200 described above with respect to FIG. 2. As described herein, the first physical layer device (e.g., 112) can be configured to communicate data with a second physical layer device (e.g., 122) over a data transmission medium using an Energy Efficient Ethernet (EEE) standard. Depending on the embodiment, the EEE is based on an Ethernet standard, such as IEEE 802.3 ch.

While in low power consumption mode, the method 400 continues with operation 404, where the first physical layer device transmits a refresh signal (e.g., a non-nominal or special refresh signal) comprising training data and non-training data. For some embodiments, the refresh signal (comprising training data and non-training data) is transmitted every Nth quiet-refresh cycle in a period of quiet-refresh cycles based on an Energy Efficient Ethernet (EEE) standard. Additionally, for some embodiments, after the refresh signal (comprising training data and non-training data) is transmitted by the first physical layer device, the first physical layer device transmits one or more data frames to the second physical layer device. As noted herein, the refresh signal transmitted (by operation 404) can be transmitted long enough that its signal-to-noise (SNR) surpasses a threshold of data transmission, such as a threshold for using PAM2 modulation or a threshold for using PAM4 modulation. Aspects of this are illustrated respect to graph 800 of FIG. 8. For some embodiments, a first portion of the refresh signal (starting after the refresh signal SNR reaches a PAM2 modulation SNR threshold) can comprise training data, and a second (backend) portion of the refresh signal (starting after the refresh signal SNR reaches a PAM4 modulation SNR threshold) can comprise non-training data.

FIGS. 5 through 7 are diagrams illustrating examples of transmitting a set of refresh signals and a set of data frame during a set of periods (from a first physical layer device to a second physical layer device), in accordance with some embodiments. In FIG. 5, refresh signals 500, 520, 530 of a first type of refresh signal and refresh signal 510 of a second type of refresh signal, where the second type of refresh signal are followed by transmission of data (e.g., 514) and the first type of refresh signal is not followed by transmission of data. As shown, each of refresh signal 500, 520, 530 is followed by quiet time (e.g., 522), refresh signal 510 is followed by wake signal 512, and wake signal 512 is followed by data transmission 514. In FIG. 5, $T_r$ represents a time duration of a first type of refresh signal that does not precede a transmission of data (e.g., 514) within a given quiet-refresh cycle, $T'_r$ represents a time duration of a second type of refresh signal that precedes a transmission of data (e.g., 514) within a given quiet-refresh cycle, $T_q$ represents a duration of a quiet time following a first type of refresh signal within a given quiet-refresh cycle, $T_w$ represents a time duration of a wake signal within a given quiet-refresh cycle, $T_d$ represents a time duration for transmitting data (e.g., one or more data frames) after a second type of refresh signal (e.g., after the refresh signal of a second type and a wake signal), and $T_r+T_q$ represents a time duration of a quiet-refresh cycle. According to some embodiments, every N cycles of quiet-refresh cycles, a second type of refresh signal (e.g., 510) is transmitted, which is followed by transmission of data (e.g., 514). For some embodiments, a wake signal (e.g., 512) can follow the second type of refresh signal and precede the transmission of data. Additionally, for some embodiments, $T'_r \geq T_r$ and $T_w \geq 0$. The refresh signal, or the refresh signal and the wake signal, can permit a receiving physical layer device to prepare to receive the transmission of data at a target error rate associated with the data-carrying low power consumption mode.

For some embodiments, data transmission 514 comprises one or more data frames, such as Reed-Solomon (RS) frames. Additionally, for some embodiments, the total time duration of each quiet-refresh cycle ($T_r+T_q$) is maintained and, accordingly, the duration of quiet time following a second type of refresh signal (e.g., quiet time 516) can be shorter than the duration of quiet time ($T_q$) following a first type of refresh signal (e.g., quiet time 522).

Referring now to FIG. 6, diagram 600 illustrates various embodiments where every N quiet-refresh cycles (while the physical layer devices are in data-carrying low power consumption mode), a refresh signal of a second type is transmitted, a wake signal is transmitted after the refresh signal, and data is transmitted after the wake signal.

Referring now to FIG. 7, diagram 700 illustrates various embodiments where refresh signals and data frames are transmitting over 5 quiet-refresh cycles (e.g., N=5), with no wake signals or refresh signals that are not followed by data frames. As shown, a specified number of data frames is transmitted after each refresh signal according to a pattern comprising (2, 2, 2, 1, 1). In the illustrated example, a stable data rate ("uniform trickle of data") can be achieved while in low power consumption mode while avoiding the overhead of transitioning between modes experienced by traditional EEE (e.g., transitioning between LPI and normal modes). The receiver of a receiving physical layer devices can be rendered completely inactive (e.g., no actively listening for alert signals) during the quiet times. Additionally, where the asymmetric data link is maintained in a data-carrying low power consumption mode, the alert signal transmission and detection can be avoided (disabled) by some embodiments, thereby allowing physical layer devices to keep components (e.g., blocks) relating to those functions deactivated and save additional power.

Figure 8:
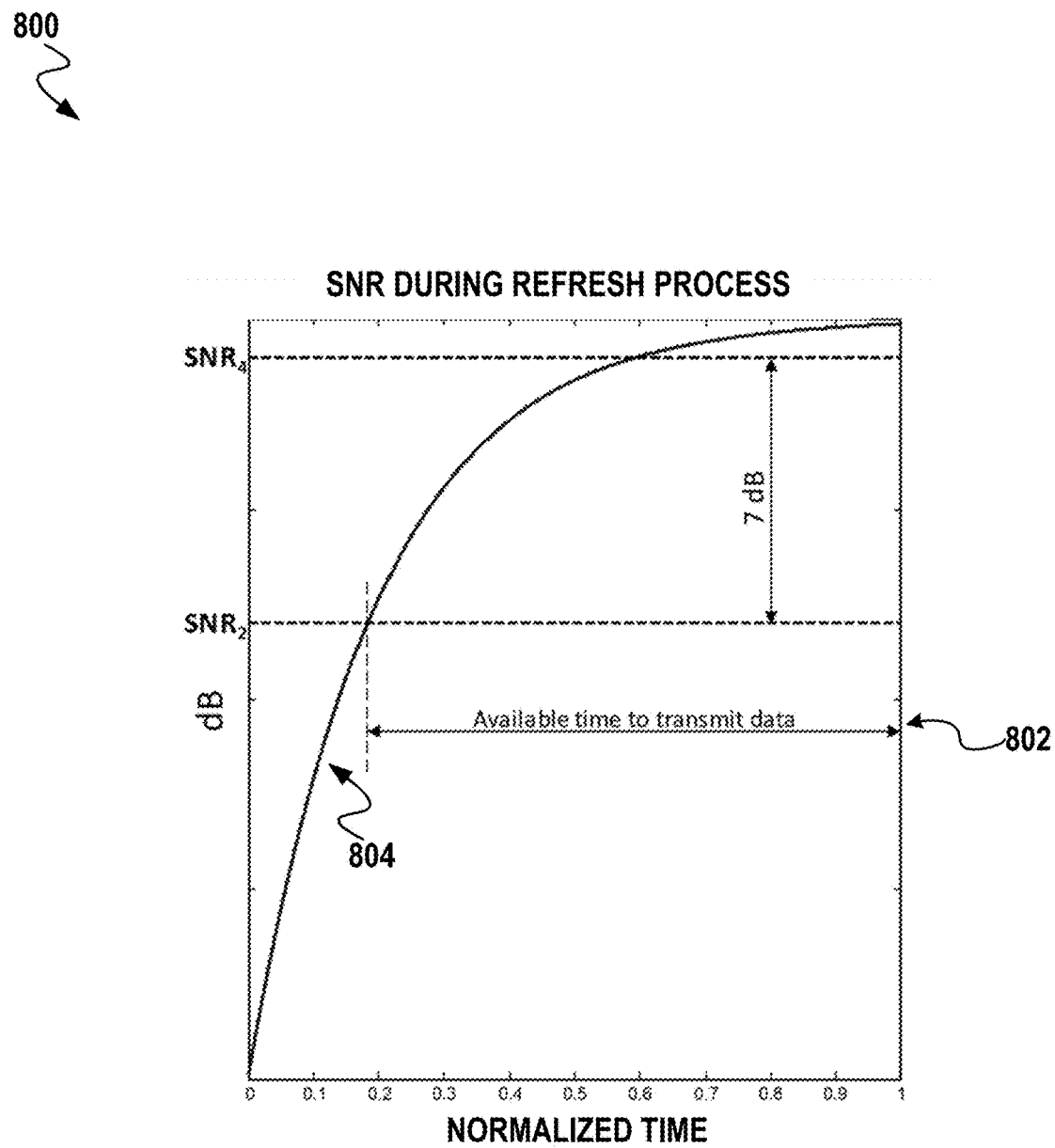
FIG. 8 is a graph illustrating an example signal-to-noise ratio (SNR) between two physical layer devices over a refresh process, in accordance with some embodiments.

FIG. 8 is a graph 800 illustrating an example signal-to-noise ratio (SNR) 804 between two physical layer devices over a refresh process, in accordance with some embodiments. In particular, graph 800 illustrates time from a beginning of a refresh process facilitated by a refresh signal. During the refresh process, a receiving physical layer device can adapt and optimize itself (e.g., its filters) based on the refresh signal from a sending physical layer device. In doing so, as shown in graph 800, the receiving physical layer device the SNR increases over time such that at the end of the refresh process SNR is high enough for data transmission (from the sending physical layer device to the receiving physical layer device) using a PAM4 modulation (i.e., the receiving physical layer device can detect data frames using the PAM4 modulation). Graph 800 illustrates a $SNR_2$ threshold after which SNR is sufficient to permit PAM2 modulation, and a $SNR_4$ threshold after which SNR is sufficient to permit for a PAM4 modulation. As shown, the $SNR_2$ threshold is lower than the $SNR_4$ threshold. A range of time 802 that starts with the SNR 804 surpassing the $SNR_2$ threshold and ends at the end of the refresh process (after the $SNR_4$ threshold is surpassed). According to some embodiments, during the range of time 802, a refresh signal comprises non-training data (or training data for the refresh process and non-training data), thereby facilitating transmission of data in place of (or in addition) to transmission of one or more data frames that follow the refresh signal. For some embodiments, the refresh signal that carries non-training data (hereafter, data-carrying refresh signal) has a longer duration than a refresh signal that does not carry non-training data. For some embodiments, the data-carrying refresh signal comprises a RS frame (e.g., one RS frame), and the RS frame can comprise a plurality of subframes (e.g., 10 subframes), where each subframe is transmitted during a cycle of the refresh process. The non-training data can be transmitted via one or more data subframes over the final period of time (e.g., 64 ns) of the RS frame.

Figure 9:
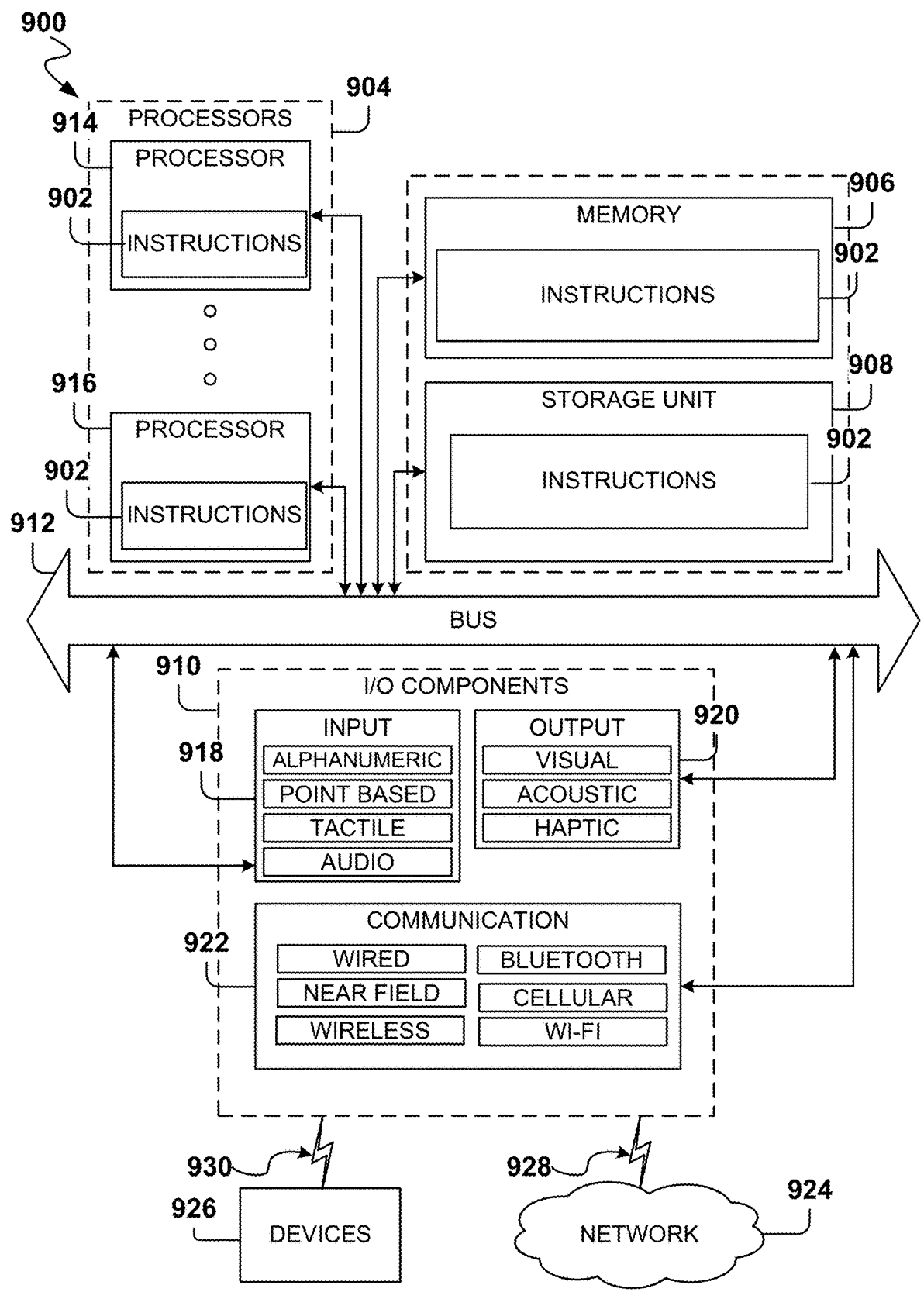
FIG. 9 is a block diagram illustrating components of an example machine that can use one or more embodiments discussed herein.

FIG. 9 is a block diagram illustrating components of an example machine 900 that can use one or more embodiments discussed herein. Specifically, FIG. 9 shows a diagrammatic representation of the machine 900 in the example form of a system, within which instructions 902 (e.g., software, a program, an application, an applet, an app, a driver, or other executable code) for causing the machine 900 to perform one or more operations that may make use of one or more of the methodologies discussed herein. For example, the instructions 902 include executable code that causes the machine 900 to execute one or more operations that cause a physical (PHY) layer device of the machine 900 (e.g., embodied by communication components 922) to perform the method 200, 300, or 400. The machine 900 may be coupled (e.g., networked) to other machines. Depending on the embodiment, the machine 900 can implement at least some portion of the first device 102 or the second device 104.

By way of non-limiting example, the machine 900 may comprise or correspond to a television, a computer (e.g., a server computer, a client computer, a personal computer (PC), a tablet computer, a laptop computer, or a netbook), a personal digital assistant (PDA), a smart phone, a mobile device, or any machine capable of executing the instructions 902, sequentially or otherwise, that specify actions to be taken by the machine 900. Further, while only a single machine 900 is illustrated, the term "machine" shall also be taken to include a collection of machines 900 that individually or jointly execute the instructions 902.

The machine 900 may include processors 904, memory 906, a storage unit 908, and I/O components 910, which may be configured to communicate with each other such as via a bus 912. In some embodiments, the processors 904 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 914 and a processor 916 that may execute the instructions 902. The term "processor" is intended to include multi-core processors 904 that may comprise two or more independent processors (sometimes referred to as "cores") that may execute instructions 902 contemporaneously. Although FIG. 9 shows multiple processors 904, the machine 900 may include a single processor with a single core, a single processor with multiple cores (e.g., a multi-core processor), multiple processors with a single core, multiple processors with multiple cores, or any combination thereof.

The memory 906 (e.g., a main memory or other memory storage) and the storage unit 908 are both accessible to the processors 904 such as via the bus 912. The memory 906 and the storage unit 908 store the instructions 902. The instructions 902 may also reside, completely or partially, within the memory 906, within the storage unit 908, within at least one of the processors 904 (e.g., within the processor's cache memory), or any suitable combination thereof, during execution thereof by the machine 900. Accordingly, the memory 906, the storage unit 908, and the memory of the processors 904 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 902. The term "machine-readable medium" shall also be taken to include any medium, or combination of multiple media, that is capable of storing instructions (e.g., instructions 902) for execution by a machine (e.g., machine 900), such that the instructions, when executed by one or more processors of the machine (e.g., processors 904), cause the machine to perform one or more operations that makes use of one or more of the methodologies described herein (e.g., the method 200, 300, or 400). Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 910 may include a wide variety of components to receive input, provide output, produce output, transmit information, exchange information, capture measurements, and so on. The specific I/O components 910 that are included in a particular machine 900 will depend on the type of the machine 900. For example, portable machines such as mobile phones will likely include a touch input device or other such input mechanisms, while a headless server machine will likely not include such a touch input device. It will be appreciated that the I/O components 910 may include many other components that are not specifically shown in FIG. 9. The I/O components 910 are grouped according to functionality merely for simplifying the following discussion and the grouping is in no way limiting. In various embodiments, the I/O components 910 may include input components 918 and output components 920. The input components 918 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components, and the like. The output components 920 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. The I/O components 910 may include communication components 922 operable to couple the machine 900 to a network 924 or devices 926 via a coupling 928 and a coupling 930 respectively. For example, the communication components 922 may include a network interface component or another suitable device to interface with the network 924. In further examples, the communication components 922 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 926 may be another machine or any of a wide variety of peripheral devices. According to various embodiments, the communication components 922 can include a transceiver described herein, a receiver described herein, or both.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A system comprising:
a first physical layer device configured to communicate data with a second physical layer device over a data transmission medium using an Energy Efficient Ethernet (EEE) standard, the first physical layer device being further configured to perform operations comprising:
while in a low power consumption mode, receiving a set of refresh signals and a set of data frames during a set of periods, each period of the set of periods comprising a sequence of quiet-refresh cycles, the receiving the set of refresh signals and the set of data frames comprising:
within an individual quiet-refresh cycle in the sequence of quiet-refresh cycles:
receiving, from the second physical layer device, a refresh signal as defined by the Energy Efficient Ethernet standard; and
receiving, from the second physical layer device, a certain number of data frames from the set of data frames after receiving the refresh signal but prior to receiving a next quiet time, the certain number being determined according to a predetermined pattern for receiving data frames during the sequence of quiet-refresh cycles, the predetermined pattern being determined between the first physical layer device and the second physical layer device during a negotiation period between the first physical layer device and the second physical layer device, the negotiation period occurring prior to or during establishment of a data link between the first physical layer device and the second physical layer device.

2. The system of claim 1, wherein the Energy Efficient Ethernet standard is based on IEEE 802.3ch.

3. The system of claim 1, wherein the operations further comprise:
during the individual quiet-refresh cycle:
receiving, from the second physical layer device, a wake signal after the refresh signal, the receiving the certain number of data frames being performed after the receiving the wake signal.

4. The system of claim 1, wherein the receiving the set of refresh signals and the set of data frames further comprises:
for at least another quiet-refresh cycle in the sequence of quiet-refresh cycles:
receiving, from the second physical layer device, a second refresh signal, the second refresh signal being followed by receipt of another refresh signal, wherein no data frames are received by the first physical layer device from the second physical layer device between the second refresh signal and the other refresh signal.

5. The system of claim 1, wherein by the receiving the certain number of data frames, the first physical layer device supports a first data transmission rate of the second physical layer device while in the low power consumption mode, the first data transmission rate being slower than or equal to a second data transmission rate available while in a normal power mode.

6. The system of claim 1, further comprising:
a media access controller layer device, the operations further comprise:
receiving a request from the media access controller layer device; and
in response to receiving the request, transitioning from a normal power mode to the low power consumption mode.

7. The system of claim 1, further comprising:
a media access controller layer device, the operations further comprise:
after the set of periods, transitioning from the low power consumption mode to a normal power mode in response to a request from the media access controller layer device.

8. The system of claim 1, further comprising:
a media access controller layer device, the low power consumption mode comprising at least one of a low power data (LPD) mode, and the operations further comprising:
after the set of periods, transitioning from the low power consumption mode to a lower power idle (LPI) mode in response to a request from the media access controller layer device.

9. The system of claim 1, wherein the first physical layer device transitions to the low power consumption mode after training is performed between the first physical layer device and the second physical layer device.

10. The system of claim 1, wherein the certain number of data frames comprises at least one data frame that is transmitted by the second physical layer device using at least one PAM2 modulation or PAM4 modulation.

11. A system comprising:
a first physical layer device configured to communicate data with a second physical layer device over a data transmission medium using an Energy Efficient Ethernet (EEE) standard, the first physical layer device being further configured to perform operations comprising:
while in a low power consumption mode, during a period comprising a sequence of quiet-refresh cycles:
receiving, from the second physical layer device, a first refresh signal during each quiet-refresh cycle of a first portion of the sequence of quiet-refresh cycles, the first refresh signal being defined by the Energy Efficient Ethernet standard; and
during each quiet-refresh cycle of a second portion of the sequence of quiet-refresh cycles where the second portion follows the first portion:
receiving, from the second physical layer device, a second refresh signal as defined by the Energy Efficient Ethernet standard; and
receiving, from the second physical layer device, a certain number of data frames after receiving the second refresh signal but prior to receiving a next quiet time, the certain number being determined according to a predetermined pattern for receiving data frames during the sequence of quiet-refresh cycles, the predetermined pattern being determined between the first physical layer device and the second physical layer device during a negotiation period between the first physical layer device and the second physical layer device, the negotiation period occurring prior to or during establishment of a data link between the first physical layer device and the second physical layer device.

12. The system of claim 11, wherein the operations further comprise:
during each quiet-refresh cycle of the second portion of the sequence of quiet-refresh cycles:
receiving, from the second physical layer device, a wake signal after the second refresh signal, the receiving the certain number of data frames being performed after the receiving the wake signal.

13. The system of claim 11, wherein the first refresh signal comprises a first type of refresh signal, the second refresh signal comprises a second type of refresh signal, and the second type of refresh signal is transmitted by the second physical layer device with a longer time duration than the first type of refresh signal.

14. The system of claim 11, wherein the first refresh signal comprises a first type of refresh signal, the second refresh signal comprises a second type of refresh signal, and the second type of refresh signal comprises training data and non-training data.

15. The system of claim 11, wherein the operations further comprise:
after the second portion of the sequence of quiet-refresh cycles, receiving, from the second physical layer device, the first refresh signal during each quiet-refresh cycle of a second sequence of quiet-refresh cycles that follows the sequence of quiet-refresh cycles, the second sequence of quiet-refresh cycles comprising a same number of quiet-refresh cycles as the first sequence of quiet-refresh cycles.

16. The system of claim 11, wherein each quiet-refresh cycle of the first portion of the sequence of quiet-refresh cycles comprises a first duration of quiet time, each quiet-refresh cycle of the second portion of the sequence of quiet-refresh cycles comprises a second duration of quiet time, and the second duration of quiet time is shorter than the first duration of quiet time.

17. A method comprising:
while a first physical layer device is in a low power consumption mode, receiving a set of refresh signals and a set of data frames during a set of periods from a second physical layer device, the first physical layer device being configured to communicate data with the second physical layer device over a data transmission medium using an Energy Efficient Ethernet (EEE) standard, each period of the set of periods comprising a sequence of quiet-refresh cycles, the receiving the set of refresh signals and the set of data frames comprising from the second physical layer device:
within an individual quiet-refresh cycle in the sequence of quiet-refresh cycles:
receiving, at the first physical layer device from the second physical layer device, a refresh signal as defined by the Energy Efficient Ethernet standard; and
receiving, at the first physical layer device from the second physical layer device, a certain number of data frames from the set of data frames after receiving the refresh signal but prior to a next quiet time, the certain number being determined according to a predetermined pattern for receiving data frames during the sequence of quiet-refresh cycles, the predetermined pattern being determined between the first physical layer device and the second physical layer device during a negotiation period between the first physical layer device and the second physical layer device, the negotiation period occurring prior to or during establishment of a data link between the first physical layer device and the second physical layer device.

18. The method of claim 17, wherein the refresh signal is received every Nth quiet-refresh cycle in a period of quiet-refresh cycles based on the Energy Efficient Ethernet standard.

19. The method of claim 17, wherein the refresh signal comprises training data and non-training data.

20. The method of claim 17, wherein the certain number of data frames comprises at least one data frame that is transmitted by the second physical layer device using at least one PAM2 modulation or PAM4 modulation.

* * * * *